United States Patent [19]

Park

[11] Patent Number: 5,208,810
[45] Date of Patent: May 4, 1993

[54] METHOD OF DATA FLOW CONTROL

[75] Inventor: Daniel J. Park, Portland, Oreg.

[73] Assignees: Seiko Corp.; Seiko Epson Corp., both of Japan

[21] Appl. No.: 595,146

[22] Filed: Oct. 10, 1990

[51] Int. Cl.$^5$ .............................................. H04J 3/24
[52] U.S. Cl. ................................... 370/94.1; 370/100.1
[58] Field of Search .................. 370/60.1, 61, 94.1, 370/94.2, 101, 60; 340/825.44, 825.52

[56] References Cited

U.S. PATENT DOCUMENTS

| | | | |
|---|---|---|---|
| 4,688,218 | 8/1987 | Blireau et al. | 370/94.2 |
| 4,713,808 | 12/1987 | Gaskill et al. | 370/93 |
| 4,839,891 | 6/1989 | Kobayashi et al. | 370/94.1 |
| 4,849,969 | 7/1989 | Annamalai | 370/100.1 |
| 4,897,835 | 1/1990 | Gaskill et al. | 370/94.1 |
| 4,939,724 | 7/1990 | Ebersole | 370/94.1 |

Primary Examiner—Douglas W. Olms
Assistant Examiner—Shick Hom
Attorney, Agent, or Firm—Elmer Galbi

[57] ABSTRACT

Data flow control is achieved by use of variable length flags delimiting information packets whereby longer flags result in less information flow and shorter flags result in greater information flow. A single channel carries message data as well as status and command data in information packets delimited by the variable length flags. The channel runs continuously such as to provide a constant flow of status and command data, yet includes flow control for preventing overflow and underflow of message data at the receiving end of the channel.

5 Claims, 4 Drawing Sheets

METHOD OF DATA FLOW CONTROL

The present invention relates to radio signal data transmission and particularly to data flow in a synchronous communication system.

CROSS-REFERENCE TO RELATED APPLICATION

The present application relates to application Ser. No. 07/595,145 titled RADIO SIGNAL DATA TRANSMISSION SYNCHRONIZATION filed Oct. 10, 1990 and commonly owned by the assignee of the present application.

BACKGROUND OF THE INVENTION

Providing information by radio transmission includes the steps of data generation and data transmission. The process of data transmission is typically separate from the process of data generation. When physically separate, a communication link delivers information from the data generating installation to the data transmission installation. In the case of time synchronous data, as provided in a time synchronous communication protocol, a predetermined transmission rate and a precise time of transmission is required. It is necessary, therefore, to provide real time synchronization of transmitted data to maintain proper system operation.

Flow control for time critical data presents additional system requirements. The data generating installation must provide a flow of data to the transmission installation at least as great as the transmission rate. If the data flow is insufficient, i.e. in the event of underflow, the transmission facility lacks data to transmit and fails to maintain system protocol. Providing an overflow of data, i.e., buffering large volumes of data at the transmission facility, is not desirable when system protocol calls for transmission as soon as possible following data generation.

SUMMARY OF THE INVENTION

The present invention provides a method of data flow control wherein information packets are separated by variable length flags. The flags serve not only to delimit packets, but also to control the effective transfer rate of packet information. Longer flags reduce the effective information transfer rate and shorter flags increase the effective information transfer rate. Information contained in the packets can include, in a paging system for example, message information and control and status information. A continuous flow of control and status information is provided while managing the flow or volume of message information on a single communication channel.

DETAILED DESCRIPTION

The present invention finds application in synchronous communication systems and will be illustrated in the context of a time division multiplexed radio signal communication protocol described in U.S. Pat. No. 4,713,808 issued to Gaskill et al on Dec. 15, 1987, and U.S. Pat. No. 4,897,835 issued to Gaskill et al on Jan. 30, 1990, the disclosures of which are incorporated herein by reference.

In accordance with this protocol, remote receivers activate during predetermined associated time slots to receive packets of transmitted paging information with each packet corresponding to a time slot of the protocol. Paging information for a particular receiver must be transmitted only during an associated time slot if it is to be received by the intended receiver. The paging information provided is synchronous, i.e., transmitted on a time critical basis.

The subject invention provides a method of data flow control between a data generating installation and a data transmission installation. The volume of paging message data is managed while providing a continuous flow of such information coupled with system control and status information.

Figure 1:
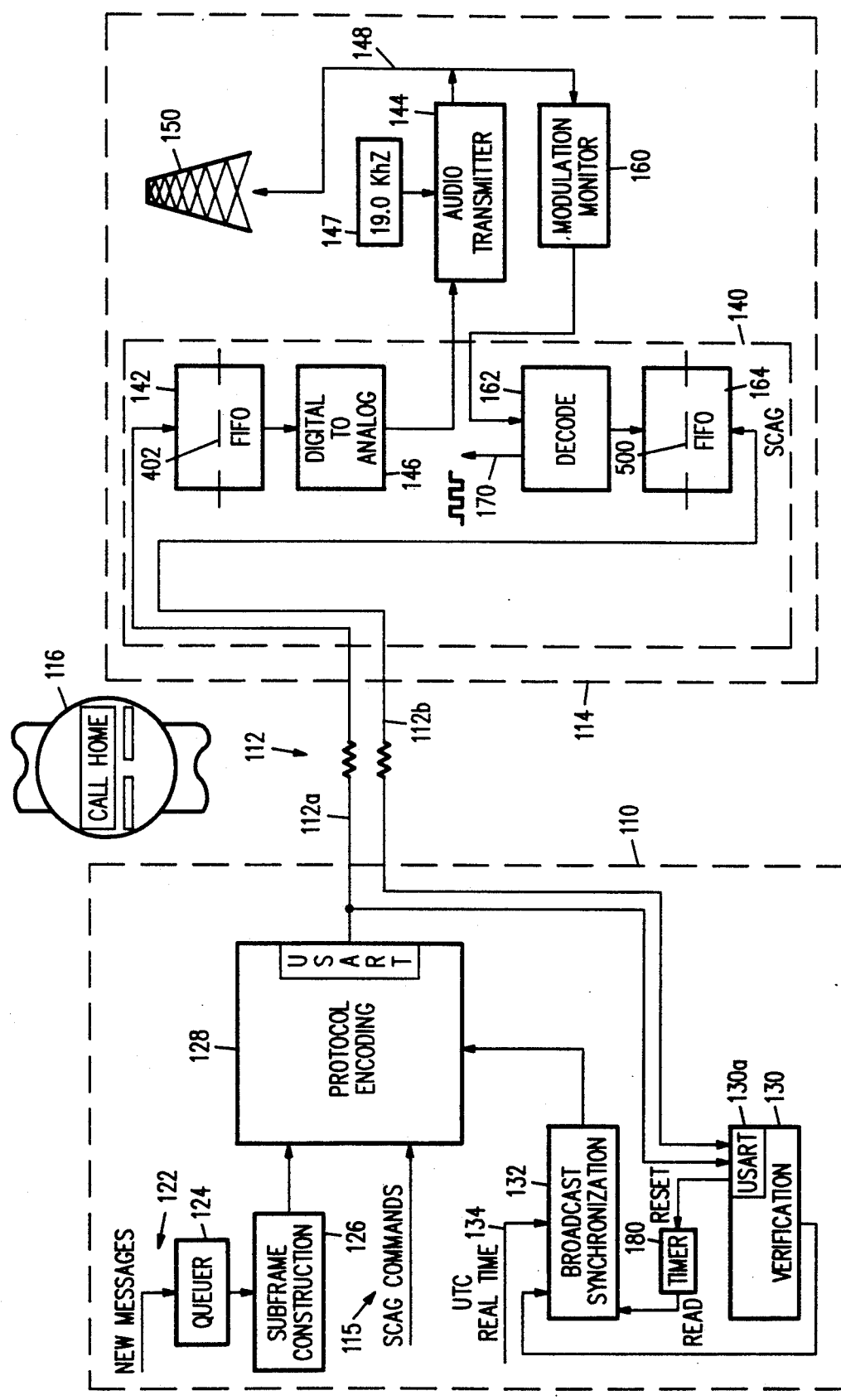
FIG. 1 illustrates a clearinghouse for generating transmission data, a radio station for transmitting data, and a remote receiver to which the transmission is directed.

In FIG. 1, a clearinghouse 110 performs a data generating process by collecting new messages and preparing those messages for transmission in accordance with system protocol. A full duplex serial communication link 112 couples clearinghouse 110 and a radio station 114. Link 112 may be provided by high speed modems (not shown) interconnected by dedicated analog or digital telephone circuits, digital DDS circuits, or microwave links. Clearinghouse 110 provides to radio station 114 the collected and encoded paging messages for transmission, and additional SCAG commands 115 for remote operation of a subcarrier generator (SCAG) 140 of radio station 114. Radio station 114 processes and transmits the paging messages at a predetermined transmission rate. A remote receiver 116 monitors the transmission provided by radio station 114 during its assigned time slots to receive paging messages. Radio station 114 also monitors the signal it generates for transmission and collects verification data. The verification data is then returned to clearinghouse 110 along communication link 112. Clearinghouse 110 uses the verification data to confirm both the content of messages transmitted and the time of message transmission.

It should be understood that SCAG 140 and clearinghouse 110 are computer based devices operating under program control and that their depiction herein illustrates data flow as it pertains to the present invention, and not all hardware details.

Figure 2:
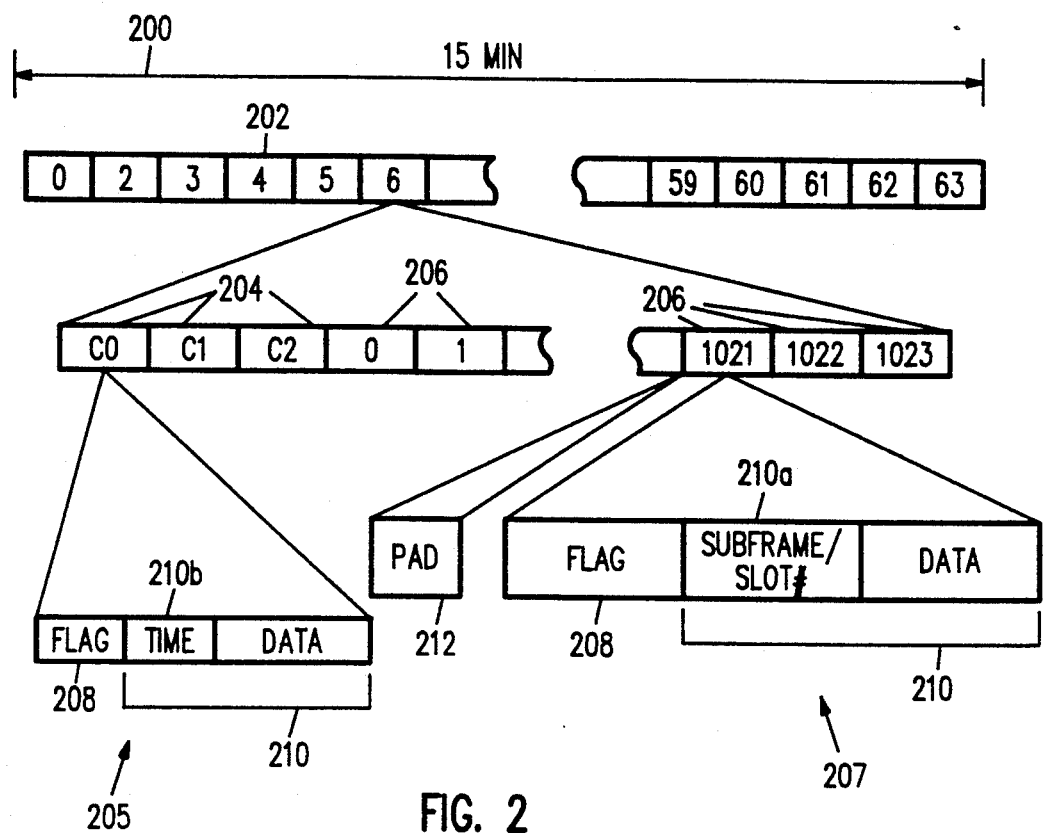
FIG. 2 illustrates a synchronous transmission protocol including a cyclic master time frame divided into subframes and time slots with padding bits selectively inserted between selected data packets for alignment with the associated time slots.

FIG. 2 illustrates a synchronous transmission protocol including the formatting and timing of data transmissions to the receivers 116. The illustrated paging system is a time division multiplexing system providing data packet transmissions with reference to a cyclic fifteen minute master time frame 200. Each master time frame 200 is divided into sixty-four subframes 202 numbered 0 to 63.

Each subframe 202 contains three control time slots 204, numbered C0 to C2, and 1024 message time slots 206, numbered 0 to 1023. Time slots 204 and 206 are of equal duration and the packets 205 and 207 transmitted during slots 204 and 206, respectfully, are similarly formatted. The data packets 205 transmitted during control time slots 204 are reserved for system information such as lists of scanning frequencies and time of day information. A paging message data packet 207 is transmitted during each message time slot 206 and carries information directed to selected receivers 116.

Packets 205 and 207 may be encoded and formatted in many ways, however, with respect to the present invention, the packets 205 and 207 are time critical data which must be broadcast during the proper time slot. As used herein, a time slot is a period of time determined by a subframe and slot number, and a station offset in a multiple radio station 114 system, referenced to universal coordinated time (UTC). Each packet 205 and 207 contains a leading 20 bit flag 208 for separating packets and a 240 bit data field 210. Data field 210 of packets 207 includes a subframe/slot number field 210a specifying position within master frame 200. The subframe/slot number field 210a of a given paging message data packet 207, therefore, indicates precisely an expected time of transmission. During control time slot C0, time of day and date information is transmitted in field 210b of data field 210. It will be understood that the degree of accuracy of time data provided during control time slot C0 is sufficient to locate the control time slot C1 within the master frame 200. The actual time of transmission of control time slot C0 is particularly critical as each receiver 116 uses this information to set its time display and to synchronize to the master time frame 200.

The set of paging message data packets 207 and control slot packets 205 corresponding a complete master frame 200 do not quite fill the required fifteen minute interval. Packets 205 and 207 each carry 260 bits of information. The total number of packets 205 and 207 transmitted in one master frame 200 (64*1027) times the number of bits in each packet (260), divided by the transmission rate 19,000 (bits/sec), and divided by 60 (sec/min) yields the number of minutes, slightly less than fifteen, required to transmit the paging data of one master time frame 200. Padding data 212 is selectively inserted between ones of packets 205 and 207. The value of padding data 212 is immaterial, its function is to hold a place in time. Changing the amount and distribution of padding data 212, relative to this a base insertion rate, within a time frame 200 in response to detected timing errors, affects the transmission time of subsequent packets 205 and 207 and maintains real time requirements, i.e. accuracy relative to UTC. In operation a padding data 212 fill bit is nominally inserted for every six packets 205 and 207, and occasionally every seven packets 205 and 207.

Returning to FIG. 1, clearinghouse 110 receives new messages 122 through telephone interaction with calling users, or from other clearinghouses of a clearinghouse network (not shown). Each new message 122 includes addressing information identifying one of receivers 116. Because each of receivers 116 is associated with certain message time slots 206, the addressing information of each new message associates that message with the time slots 206 during which that message can be broadcast. A QUEUER function 124 of clearinghouse 110 maintains a data structure associating new messages with their assigned time slots 206. A SUBFRAME CONSTRUCTION function 126 of clearinghouse 110 builds a subframe 202 by collecting from QUEUER function 124 available new messages and incorporating system information to be transmitted during control slots 204. The time of day information placed in control slot C0 and the subframe and slot numbers placed in message data packets 207 of the newly constructed subframe 202 correspond to their expected time of transmission. A PROTOCOL ENCODING function 128 transforms the message packets, e.g., inserts error correction and detection codes, as necessary in accordance with system protocol. PROTOCOL ENCODING function 128 provides ready for transmission the 240 bit data field 210 of paging packets 205 and 207. The twenty bit flag 208, required to complete each packet 205 and 207, is provided at the time of transmission by radio station 114.

Data sent to radio station 114 by clearinghouse 110 is returned along communication link 112 as verification data. A VERIFICATION function 130 of clearinghouse 110 monitors communication link 112 to collect information sent to radio station 114 and accepts verification data returned by radio station 114. The verification data is compared to the data sent to radio station 114 to detect transmission errors. Additional verification data information, originating from radio station 114 and detected by VERIFICATION function 130, indicates a time of transmission for certain data packets taken as transmission time sample points.

A BROADCAST SYNCHRONIZATION function 132 of clearinghouse 110 receives a real time reference 134 for detecting a timing error relative to the indicated time of transmission information provided by VERIFICATION function 130. Any transmission timing errors detected by BROADCAST SYNCHRONIZATION function 132 result in adjustment, i.e., increase or decrease the amount of padding data 212 so as to correct the timing error.

Radio station 114 includes a subcarrier generator (SCAG) 140 in communication with clearinghouse 110 by way of link 112. SCAG 140 receives the incoming message data within an input FIFO buffer 142. SCAG 140 removes message data from FIFO buffer 142 at a predetermined data transmission rate, passing the message data to the radio station 114 main transmitter 144 by way of DIGITAL-TO-ANALOG (D/A) function 146. Main transmitter 144 incorporates the output of D/A function 146 as a subcarrier signal accompanying its normal audio signal transmission. The main transmitter 144 of radio station 114 also receives a 19 kHz reference 147 as a source for a 19 kHz pilot tone provided within its signal 148 delivered to antenna 150. Signal 148 is transmitted by antenna 150 for reception by receivers 116.

SCAG 140 also inserts the twenty bit flags 208, used to delimit packets 205 and 207 as transmitted. More particularly, to delimit the fields 210 of packets 205 and 207. SCAG 140 also inserts padding data 212 as instructed by clearinghouse 110 to maintain UTC time synchronization of packets 205 and 207.

Figure 3:
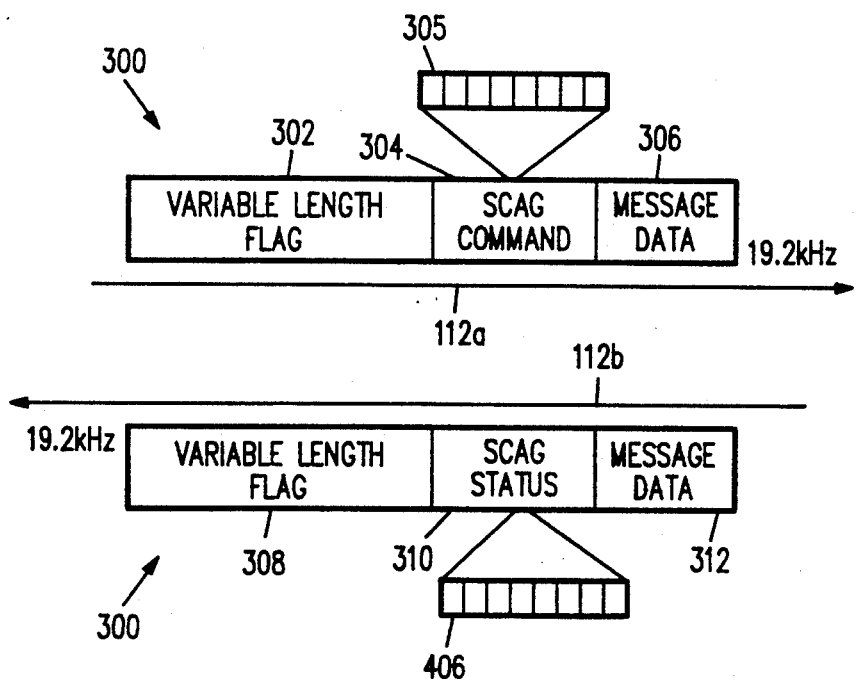
FIG. 3 illustrates data formatting on a communication link coupling the clearinghouse and radio station of FIG. 1.

With reference to FIGS. 1 and 3, as for insertion of padding data 212 at radio station 114, each packet 205 and 207 is associated with a SCAG command byte 304 as transferred in packets 300 along communication link 212. The most significant bit 305 of the SCAG command byte 304 is reserved for instruction as to insertion of padding data 212. If bit 305 of SCAG command byte 304 is set true, then SCAG 140 inserts a single bit as padding data 212 transmitted adjacent the associated packet 205 or 207. If bit 305 is false, no padding data 212 is inserted. Thus, SCAG 140 simply inserts padding data 212 a instructed by clearinghouse 110 by way of SCAG command byte 304. Clearinghouse 110 is responsible for management of the padding data 212 insertion rate.

A modulation monitor 160 of radio station 114 receives signal 148 as provided to antenna 150 and extracts the audio portion, i.e., left plus right, 19 kHz pilot tone, and left minus right, and subcarrier portion of signal 148. A DECODE function 162 of SCAG 140, substantially identical to that used in receivers 116, collects fields 210 of packets 205 and 207 from the extracted subcarrier signal provided by modulation monitor 160. The collected message data is placed in an output FIFO buffer 164 and eventually returned on link 112 as fields 312 of packets 300.

DECODE function 162 also extracts from modulation monitor 160 the 19 kHz pilot tone, as available within the signal 148, to provide a digital 19 kHz transmission rate clock 170 as a timing reference for SCAG 140. Clock 170 provides a time base for moving data from buffer 142 to D/A function 146 and, therefore, establishes the nominally 19,000 bps data transmission rate for the system.

FIG. 3 illustrates data formatting and transfer rate on communication link 112. On the uplink leg 112a of link 112, each packet 300 includes a variable length flag 302, a SCAG command byte 304, and a message data field 306 comprising the 240 bit data field 210 for broadcast in a packet 205 or 207. On the down link leg 112b of link 112, each packet 300 includes a variable length flag 308, a SCAG status byte 310, and verification field 312 representing field 210 of a transmitted packet 205 and 207. In the illustrated embodiment, communication link 112 must operate at a faster data transfer rate than the system data transmission rate of 19,000 bps. In the illustrated embodiment, communication link 112 moves data at 19,200 bps to insure that data moves to radio station 114 faster than it is transmitted, to avoid a lapse of paging message transmissions, and to accommodate the additional data it carries, e.g., SCAG command bytes 304, SCAG status bytes 310, flags 302, and flags 308.

It may be appreciated that, because communication link 112 carries SCAG commands and status information, continuous data flow on communication link 112 is desirable. Also, it is desirable to transmit message data packets as soon as possible after a subframe is constructed at clearinghouse 110, so buffering large volumes of message data fields 306 at radio station 114 is undesirable. Data flow management as described herein permits constant flow of SCAG command and status information, allowing continuous control and monitoring of the radio station SCAG 140, while buffering only small amounts of message data fields 306, allowing transmission of paging messages as soon as possible following construction at the clearinghouse 110.

Management of data flow from clearinghouse 110 to radio station 114 is accomplished by selectively modifying the length of flags 302 on the uplink leg 112a of communication link 112. Thus, flags 302 serve a dual purpose, to separate packets 300 traveling on link 112 and to increase or decrease the effective transfer rate of packets 205 and 207 as provided in message data fields 306 of packets 300. In the illustrated embodiment, flags 302 may be either short, one byte, or long, two bytes. To slow down the effective transfer rate of message data, use of long flags 302 results in less message data, i.e., message data fields 306, delivered to radio station 114. To increase the effective transfer rate of message data fields 306, use of short flags 302 results in more message data arriving at radio station 114.

The system is configured such that if all flags 302 were short, then the effective transfer rate of message packet fields 306 would be less than their transmission rate, taking into account the 20 bit fields 208 added by SCAG 140, whereby FIFO buffer 142 of radio station 114 can empty to correct a potential overflow condition. Similarly, if all flags 302 were long, the effective transfer rate of message packet fields 306 should be greater than their transmission rate so as to fill FIFO buffer 142 to correct a potential underflow condition. By dynamically selecting use of long flags 302 and short flags 302, the average effective transfer rate of message data will substantially equal its transmission rate such that overflow and underflow of FIFO buffer 142 is avoided.

Figure 4A:
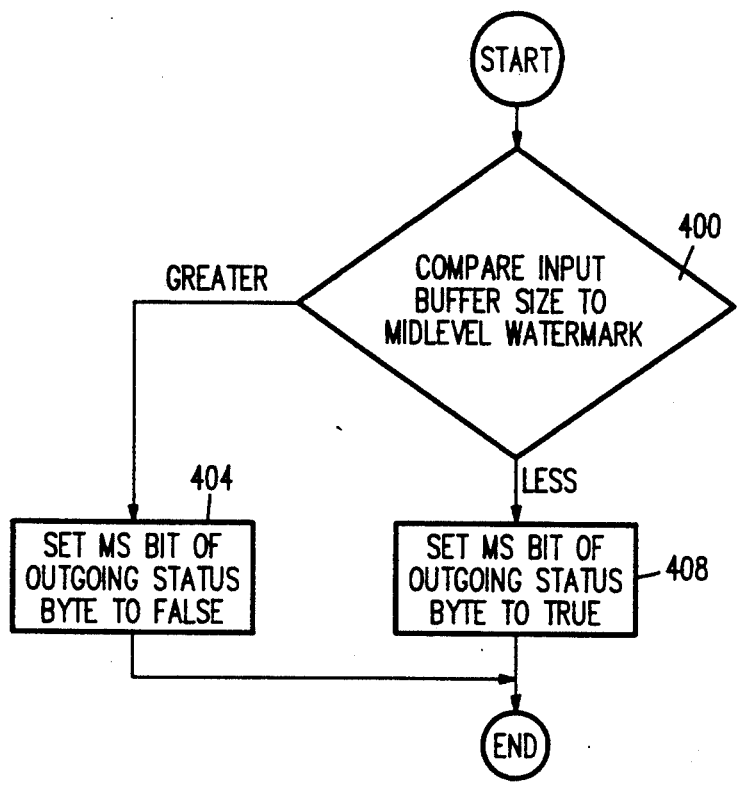
FIGS. 4A-4D illustrate data flow control for delivering clearinghouse data to the radio station of FIG. 1.

FIG. 4A is a flow chart of SCAG 140 programming for managing data flow from clearinghouse 110. The illustrated routine is executed as necessary, sampling the contents of FIFO buffer 142, i.e. prevent underflow and overflow. In block 400, SCAG 140 compares the current size, i.e., volume of message data, of FIFO buffer 142 to a midlevel watermark 402. SCAG 140 uses the most significant bit 406 of the SCAG status byte 310 to indicate to clearinghouse 110 the condition of FIFO buffer 142. Bit 406 is set true in block 408 to indicate "send more message data" when FIFO buffer 142 is low, and set false in block 404 to indicate "send less message data." Outgoing SCAG status bytes are queued in FIFO buffer 164 and there available for modification as described in blocks 404 and 408 to maintain data flow to FIFO buffer 142.

Figure 4B:
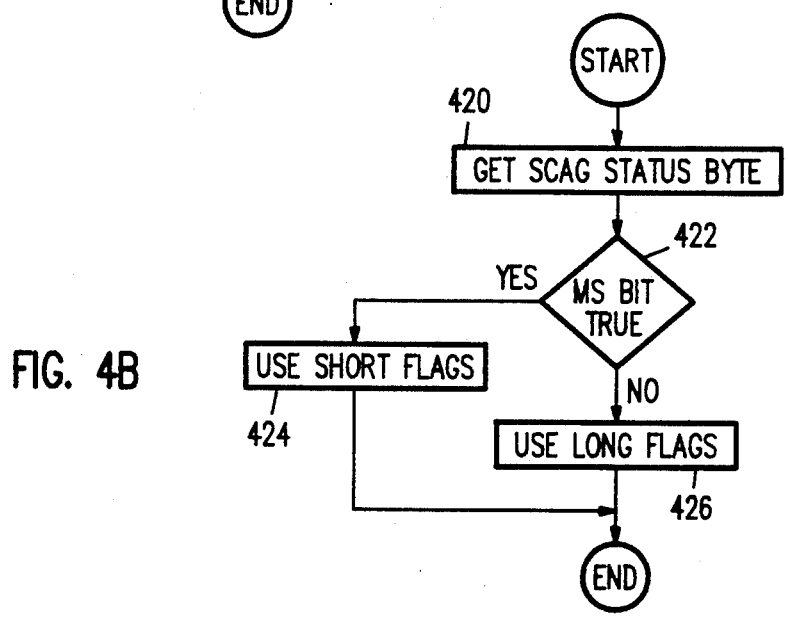

FIG. 4B is a flow chart of a fragment of a clearinghouse 110 program for processing SCAG status bytes 310 as received from radio station 114. In block 420, clearinghouse 110 extracts the incoming SCAG status byte 310. In decision block 422, clearinghouse 110 checks the state of bit 406 of SCAG status byte 310. If bit 406 is set true, clearinghouse 110 executes block 424 wherein subsequent transmission of packets 300 to radio station 114 includes short flags 302. The effective transfer rate of message data to radio station 114 is increased and an underflow condition for FIFO buffer 142 is avoided. If in block 422 bit 406 is false, clearinghouse 110 executes block 426 resulting in subsequent use of long flags 302. Less message data is sent and an overflow condition in FIFO buffer 142 is avoided.

Figure 4C:
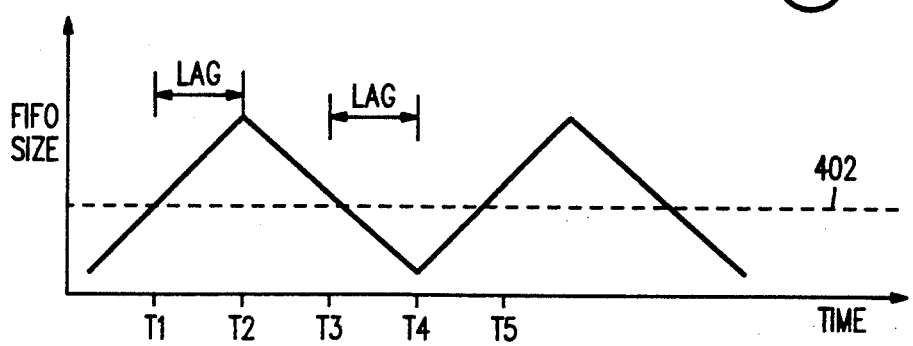

FIG. 4C plots the size, i.e., level of message data, in FIFO buffer 142 against time. At time T1 SCAG 140 detects the contents of FIFO buffer 142 as exceeding watermark 402 and instructs clearinghouse to send less message data, i.e. use long flags 302. During the following lag period T2−T1, the volume of data in FIFO buffer continues to grow until the time T2 when clearinghouse actually starts using long flags 302. The level of message data in FIFO buffer 142 then begins to reduce, the transmission rate of message data leaving radio station 114 being greater than the transfer rate to radio station 114. At time T3 SCAG 140 detects the level of message data in FIFO buffer 142 as falling below watermark 402 and instructs clearinghouse 110 to use short flags 302 to increase message data flow. At a later time T4, following a lag period T4−T3, clearinghouse 110 acts on these instructions and FIFO buffer 142 begins to fill with message data. The cycle repeats beginning at time T5 when SCAG 140 detects the size of FIFO buffer 142 as exceeding watermark 402.

Thus, management of data flow to radio station 114 is achieved by avoiding overflow and underflow of FIFO buffer 142. A similar use of long and short flags 308 is used to prevent underflow and overflow of buffer 164. In such case, SCAG 140 manages directly the use of long and short flags sent to clearinghouse 110 as SCAG 140 can monitor directly to volume of data in buffer 164.

Figure 4D:
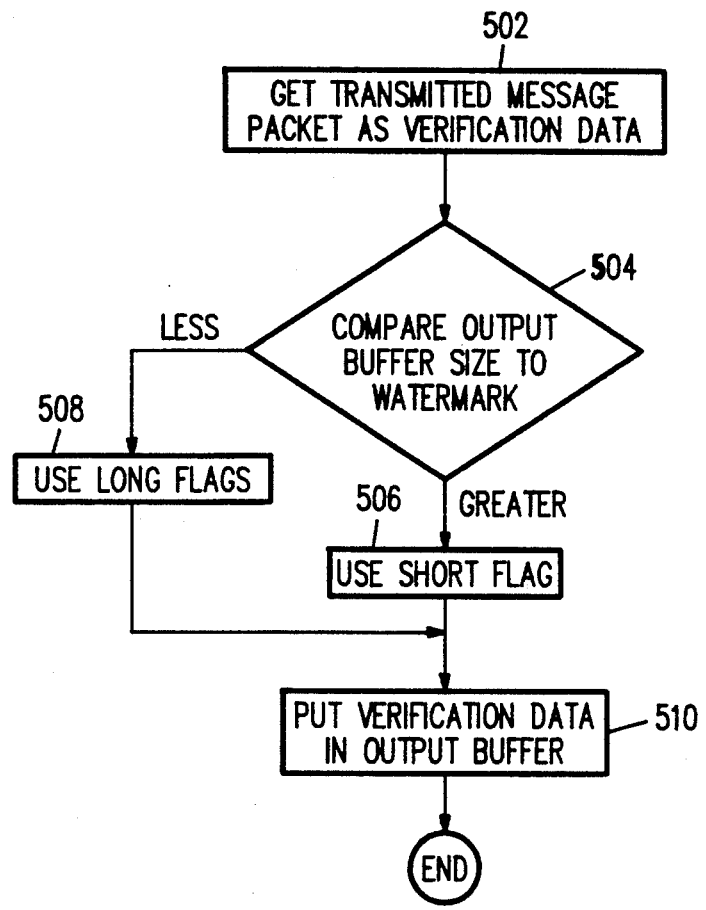

FIG. 4D illustrates programming of SCAG 140 to manage data flow to clearinghouse 110. The program segment of FIG. 5A is executed when SCAG 140 places a verification data packet 300 in FIFO buffer 164, and controls whether a long flag 308, i.e. two bytes, or a short flag 308, i.e. one byte, is used for that packet 300. In block 502 of FIG. 5A, SCAG 140 gets a packet 205 or 207 from DECODE function 162 and constructs a verification data packet 300 for placement in FIFO buffer 164. In decision block 504 SCAG 140 compares the size, i.e. amount of data, in FIFO buffer 164 to the watermark 500. If the size of FIFO buffer 164 is greater than watermark 500, then in block 506 SCAG 140 uses a short flag 308 for the verification data packet 300. If the size of FIFO buffer 164 is less than watermark 500, SCAG 140 uses a long flag 308 for the verification data packet 300. In block 510, SCAG 140 places the verification data packet in FIFO buffer 164. By selectively using long and short flags 308 as a function of the size of buffer 164 relative to watermark 500, overflow and underflow of buffer 164 is avoided. It should be appreciated that this process maintains a continuous flow of SCAG command bytes 304 to radio station 114 and SCAG status bytes 310 from radio station 114. Thus, message data, commands, and status information are provided on a single full duplex communication channel, and data flow is managed without interrupting the flow of SCAG command bytes 304 and SCAG status bytes 310.

Thus, an improved method of data flow control has been shown and described. Having described and illustrated the principles of the invention and a preferred embodiment thereof, it will be apparent to those skilled in the art that the invention may be modified in arrangement and detail without departing from such principles.

We claim:

1. A method of delivering information from a data providing device to a radio transmitting device, said information being processed at the radio transmitting system at a predetermined data processing rate, the method comprising,
constructing delivery data comprising the information as data packets and flags separating the packets, the flags being of selectably variable length; said data packets including commands for said radio transmitting system and data to be transmitted by said radio transmitting system,
transmitting said delivery data to said radio transmitting system at a rate greater than the predetermined processing rate; and
controlling the amount of said information transmitted to said radio transmitting system by selecting said flag lengths whereby (a) longer flags result in less of said information delivered to said radio transmitting system, (b) shorter flags result in more of said information delivered to said radio transmitting system, and (c) said delivery data is substantially continuously transmitted to said radio transmitting system.

2. The method according to claim 1 wherein said controlling step comprises:
extracting at said radio transmitting system said data packets from said delivery data;
storing at said radio transmitting system said extracted packets within a receiving buffer;
indicating to said radio transmitting system a volume of said information within said buffer; and
adjusting said flag lengths to avoid overflow and underflow of said information within said buffer.

3. A method of delivering time critical data from a data generating installation to a data transmission installation for transmission in accordance with a synchronous communication protocol, said protocol requiring transmission of said data at a predetermined transmission data rate, the method comprising:
constructing at said data generating installation said time critical data as a sequence of data packets including flags of selected variable length separating said data packets;
delivering said sequence of data packets to said transmission installation at a delivery data rate greater than said transmission data rate;
receiving at said transmission installation said sequence of data packets within a first data queue;
transmitting at said transmission installation data packets taken from said first data queue at said predetermined transmission data rate;
placing at said transmission installation the transmitted data packets within a second data queue;
removing at said transmission installation the data packets within said second data queue;
delivering to said data generating installation as verification data the data packets taken from said second data queue;
detecting at said transmission installation a volume of data in said first queue and providing within said verification data an indication of the detected volume of data; and
monitoring at said data generating installation said verification data and adjusting the length of selected flags in accordance with the indication of the volume of data within said first data queue whereby overflow and underflow of data packets to said first data queue is avoided.

4. In a system which includes first means which utilizes data at a first standard rate,
transmitting data to said first means at a second standard rate, said second rate being faster than said first rate, said data including messages separated by variable length flags,
buffering said transmitted data by storing said messages in a buffer, before they reach said first means,
increasing the length of said flags when the amount of data in said buffer is above a certain level and for decreasing the length of said flags when the amount of data in said buffer is below a certain level,
whereby said buffer does not overflow or become empty and said first means can operate at said first standard rate and said data can be transmitted at said second standard rate.

5. The method according to claim 4 wherein said variable flag lengths comprise a short length and a long length, said short length being such that if all flags were of said short length a transmission rate of said information within said delivery data would be less than said predetermined processing rate and if all flags were of said long length the transmission rate of said information within said delivery data would be greater than said predetermined processing rate whereby dynamic proportioning of said short length to said long length, in accordance with the indicated volume of data within said buffer, maintains an average transmission rate of said information within said delivery data substantially at said predetermined processing rate.

* * * * *